(12) United States Patent
Najima

(10) Patent No.: US 9,982,700 B2
(45) Date of Patent: May 29, 2018

(54) FASTENER

(71) Applicant: PIOLAX, INC., Yokohama-shi (JP)

(72) Inventor: Masahiro Najima, Yokohama (JP)

(73) Assignee: PIOLAX, INC., Yokohama-Shi, Kanagawa (JP)

(*) Notice: Subject to any disclaimer, the term of this patent is extended or adjusted under 35 U.S.C. 154(b) by 0 days. days.

(21) Appl. No.: 15/324,213

(22) PCT Filed: May 21, 2015

(86) PCT No.: PCT/JP2015/064569
§ 371 (c)(1),
(2) Date: Jan. 5, 2017

(87) PCT Pub. No.: WO2016/006328
PCT Pub. Date: Jan. 14, 2016

(65) Prior Publication Data
US 2017/0198738 A1 Jul. 13, 2017

(30) Foreign Application Priority Data
Jul. 8, 2014 (JP) .................................. 2014-140723

(51) Int. Cl.
F16B 19/10 (2006.01)
B60R 13/02 (2006.01)
F16B 13/06 (2006.01)

(52) U.S. Cl.
CPC .......... *F16B 19/10* (2013.01); *B60R 13/0206* (2013.01); *B60R 13/0256* (2013.01); *F16B 13/06* (2013.01)

(58) Field of Classification Search
CPC ...... F16B 13/06; F16B 13/0858; F16B 19/08; F16B 19/10; F16B 19/1027;
(Continued)

(56) References Cited

U.S. PATENT DOCUMENTS 4,952,106 A * 8/1990 Kubogochi ......... F16B 19/1081
411/48
5,085,545 A * 2/1992 Takahashi ........... F16B 19/1027
411/45
(Continued)

FOREIGN PATENT DOCUMENTS

JP S 60-87741 U 6/1985
JP 2003-214470 A 7/2003
(Continued)

OTHER PUBLICATIONS

International Search Report (ISR) (PCT Form PCT/ISA/210), in PCT/JP2015/064569, dated Jul. 7, 2015.

*Primary Examiner* — Roberta S Delisle
(74) *Attorney, Agent, or Firm* — McGinn IP Law Group, PLLC.

(57) ABSTRACT

A fastener attached to an attachment hole of an attachment member, wherein a grommet has a head section having an opening, and a plurality of leg pieces having an outer surface capable of engaging with an edge of the attachment hole of the attachment member by expansion of the leg pieces. A pin member is pressed in from the opening to splay the plurality of leg pieces. The leg pieces each have: a flexure section that extends downward from the head section and is flexible for spreading out; and an inclined surface that is formed radially inwardly away from an inner surface of the flexure section, inclined downwardly toward the center axis, and subjected to a pressing force from the pin member when the pin member is pressed in.

7 Claims, 9 Drawing Sheets

(58) Field of Classification Search
CPC .............. F16B 19/1081; F16B 21/086; B60R 13/0206; B60R 13/0256
USPC ...................... 411/45, 53, 54.1, 56, 508–509
See application file for complete search history.

(56) References Cited

U.S. PATENT DOCUMENTS

| | | | | |
|---|---|---|---|---|
| 5,211,519 | A * | 5/1993 | Saito | .................... F16B 19/1081 411/45 |
| 5,632,581 | A * | 5/1997 | Hasada | ............... F16B 19/1081 411/48 |
| 5,641,255 | A * | 6/1997 | Tanaka | ................ F16B 19/1081 411/45 |
| 6,769,849 | B2 * | 8/2004 | Yoneoka | ............... F16B 5/0642 411/41 |
| 6,979,162 | B2 * | 12/2005 | Kato | .................... F16B 19/008 411/371.1 |
| 7,222,398 | B2 * | 5/2007 | Koike | .................... B62D 27/02 24/297 |
| 7,249,922 | B2 * | 7/2007 | Yoneoka | ............. F16B 19/1081 411/41 |
| 8,419,330 | B2 * | 4/2013 | Watanabe | ........... F16B 19/1081 411/45 |
| 2004/0175250 | A1 | 9/2004 | Yoneoka | |
| 2005/0123372 | A1 | 6/2005 | Sato | |
| 2011/0116890 | A1 | 5/2011 | Okada et al. | |
| 2012/0057948 | A1 * | 3/2012 | Jeon | .................... F16B 19/1081 411/357 |

FOREIGN PATENT DOCUMENTS

| | | |
|---|---|---|
| JP | 2003-232318 A | 8/2003 |
| JP | 2004-263811 A | 9/2004 |
| JP | 2005-249073 A | 9/2005 |
| JP | 2006-105359 A | 4/2006 |
| JP | 2007-198465 A | 8/2007 |
| JP | 2013-238286 A | 11/2013 |
| WO | WO 2010/007828 A1 | 1/2010 |

* cited by examiner

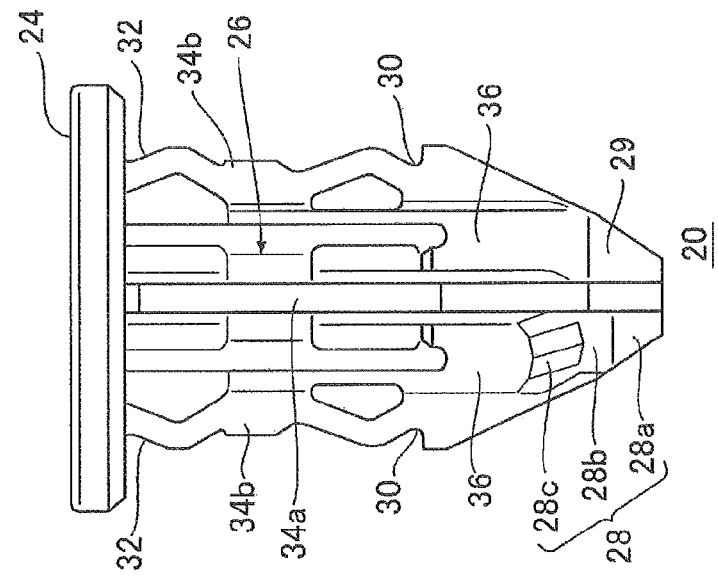
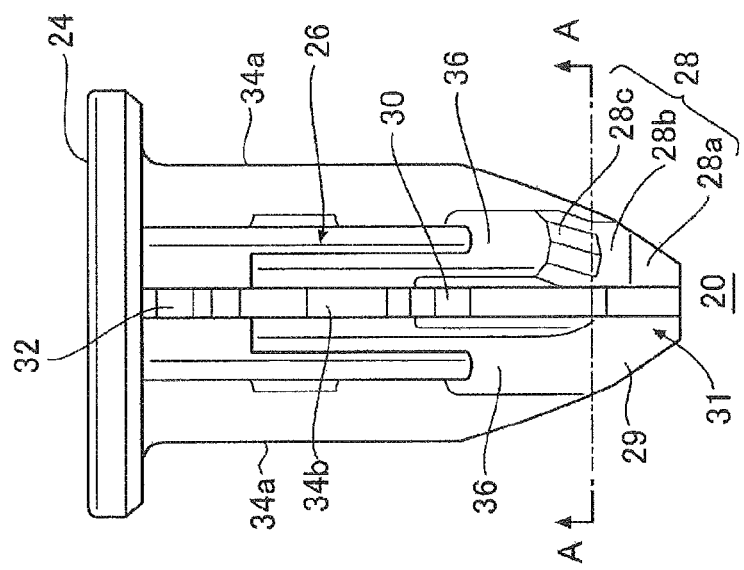
FIG. 2A
FIG. 2B

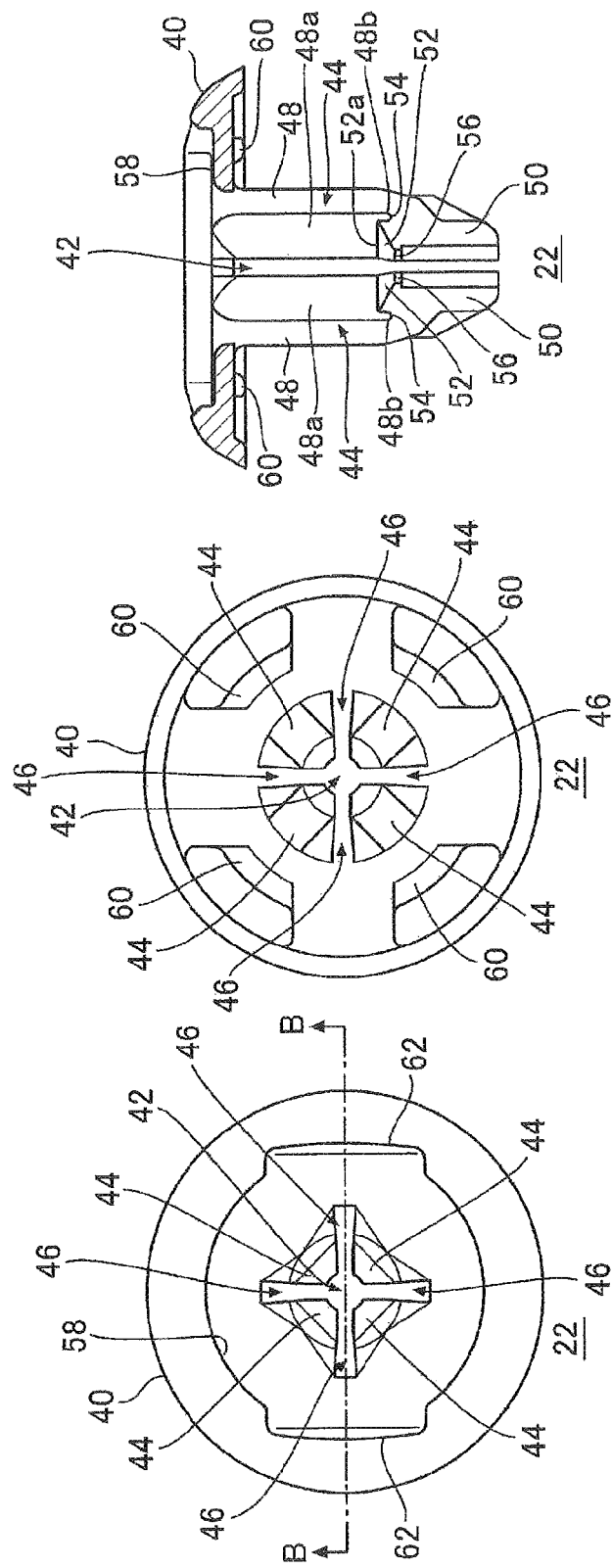

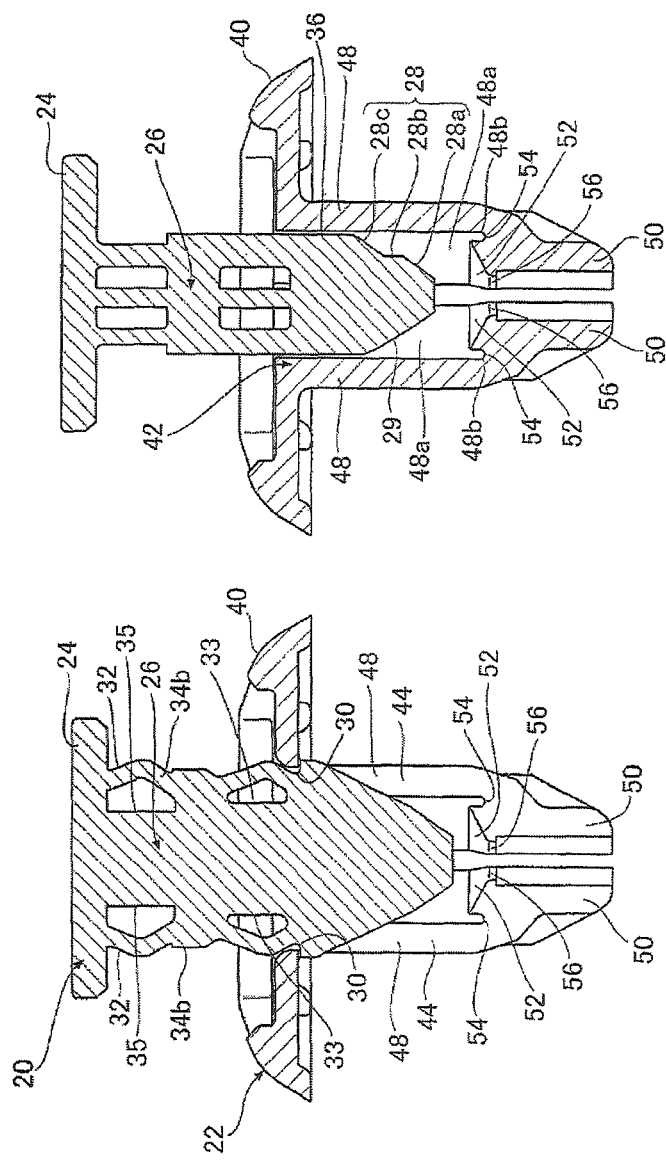

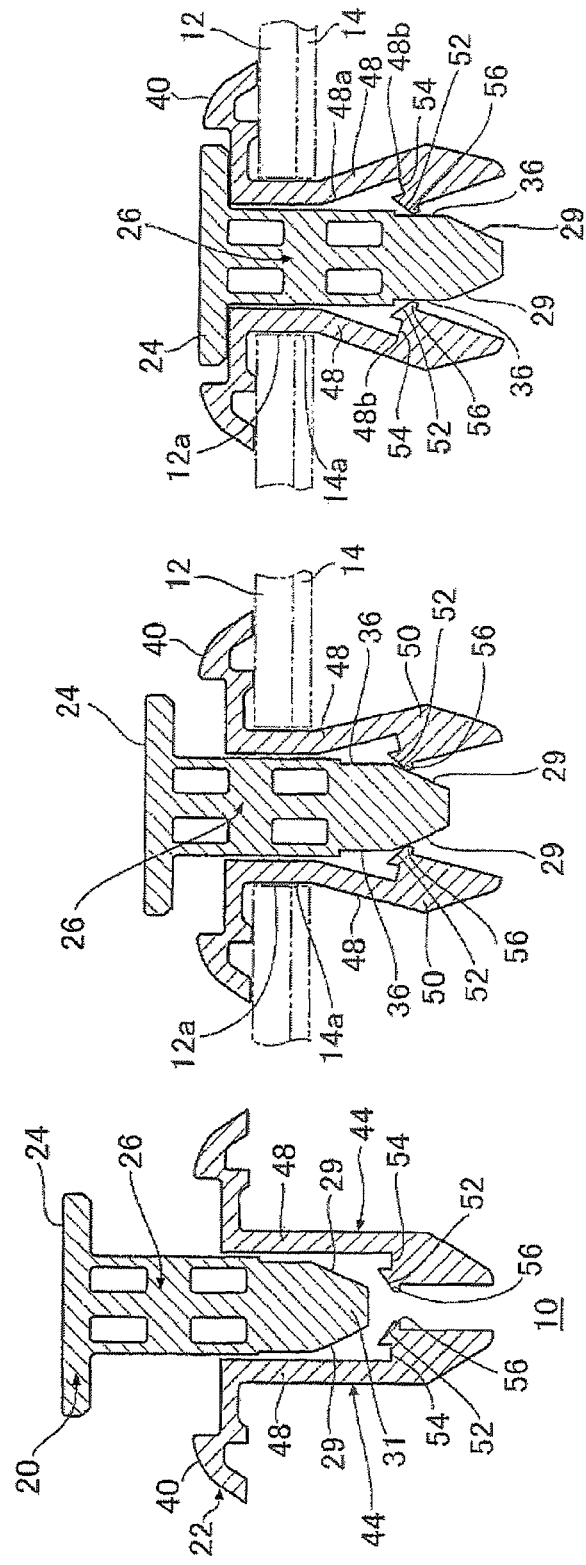

FASTENER

TECHNICAL FIELD

The present invention relates to a fastener to be attached to attachment holes of attachment members.

BACKGROUND ART

Fasteners are used for attaching upholstery trim boards to vehicle body panels. A trim board is attached to a vehicle body panel by placing the former on the latter and inserting a fastener into their respective attachment holes. Patent document 1 discloses a fastening member for fastening an upholstery component of an automobile to a panel component. The fastening member includes a grommet and a pin.

The grommet disclosed in Patent document 1 has a brim portion having an opening, a cylindrical base portion projecting downward from the brim portion, a thin hinge portion projecting downward from the base portion, and four thick leg pieces formed under the hinge portion. Each leg piece has a guide portion that projects from an inner surface of the leg piece toward the center line of the grommet. By receiving the pin being pushed in through the opening at the guide target portions, the leg pieces are expanded, and the hinge portion are bent.

PRIOR ART DOCUMENTS

Patent Documents

PATENT DOCUMENT 1: JP-2006-105359-A

SUMMARY OF THE INVENTION

Problems to be Solved by the Invention

In the technique disclosed in Patent document 1, a thick upholstery component and panel member can be fastened by making the hinge portion of the grommet long in the axial direction. On the other hand, if the hinge portion is made long in the axial direction, it may become prone to bend to make the fastening force weaker.

The present invention has been made in view of the above problem, and an object of the invention is therefore to provide a fastener which is applicable to wide thickness ranges of attachable attachment members while maintaining the fastening force.

Means for Solving the Problems

To solve the above problem, an aspect of the invention provides a fastener to be attached to attachment holes of attachment members, the fastener including: a grommet having a head portion with an opening, and plural leg pieces engageable with an edge of the attachment holes of the attachment members at their outer surfaces by being expanded; and a pin member which is pushed in through the opening to thereby expand the plural leg pieces. Each of the leg pieces has: a bendable portion which projects downward from the head portion and which is bendable to be expanded; and an inclined surface which is formed so as to be distant from an inner surface of the bendable portion inward in a radial direction, which is inclined downward as it approaches toward a center axis, and which receives a push-in force from the pin member when the pin member is pushed in.

Advantages of the Invention

The invention provides a fastener which is applicable to wide thickness ranges of attachable attachment members while maintaining the fastening force.

BRIEF DESCRIPTION OF THE DRAWINGS

FIGS. 2A and 2B are views for description of a pin member.

FIGS. 4A to 4C are views for description of a grommet.

FIG. 6A is a sectional view of the fastener taken along line C-C in FIG. 5B, and FIG. 6B is a sectional view of the fastener taken along line D-D in FIG. 5B.

FIGS. 7A to 7C are views for description of how the fastener is attached.

MODES FOR CARRYING OUT THE INVENTION

Figure 1:
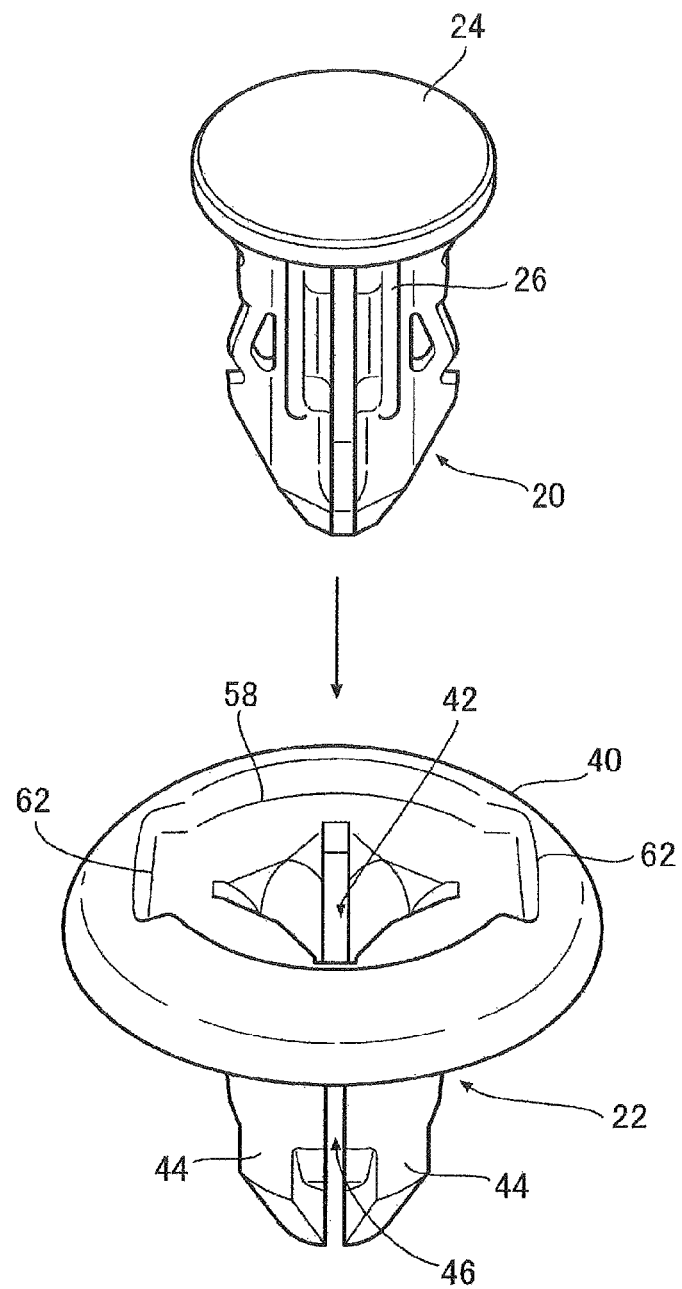
FIG. 1 is an exploded view of a fastener according to an embodiment.

FIG. 1 is an exploded view of a fastener 10. The fastener 10 which is made of a resin is used for attaching a first attachment member to a second attachment member. For example, the fastener 10 may be used for attaching such a first attachment member as a trim board or an instrument panel to such a second attachment member as a vehicle body panel or attaching such a first attachment member as a decorative component to such a second attachment member as a trim board or an instrument panel. The first attachment member and the second attachment member (referred to as "attachment members" when they are not discriminated form each other) are formed with a first attachment hole and a second attachment hole (referred to as "attachment holes" when they are not discriminated form each other), respectively. How attachment is made using the fastener 10 will be described later in detail.

The fastener 10 includes a pin member 20 and a grommet 22. The grommet 22 has a head portion 40 having an opening 42 and plural leg pieces 44 capable of expanding. The pin member 20 is pushed in through the opening 42 and thereby expands the plural leg pieces 44. When the plural leg pieces 44 are bent and expanded by pushing in the pin member 20, the outer surfaces of the leg pieces 44 are engaged with the edge of the second attachment hole of the second attachment member.

The head portion 40 has a disc-like shape, and the surface of the head portion 40 is formed with a recess 58 for receiving a flange 24 of the pin member 20 and disengagement cuts 62 for forming respective gaps between the head portion 40 and the outer circumference of the flange 24. A jig for pulling out the pin member 20 can be inserted through the disengagement cuts 62. The number of leg pieces 44 are four in total and are erected from the back surface of the head portion 40. The four leg pieces 44 are spaced from each other by four slits 46 and arranged in the circumferential direction at equal intervals. In the following description, it is assumed that, as to the grommet 22, the head portion 40 side of the leg pieces 44 is the top side and the tip side of the leg pieces 44 is the bottom side, and that, as to the pin member 20, the flange 24 side is the top side and the tip side of a body 26 is the bottom side. However, the fastener 10 is not necessarily used so as to be oriented in the above manner in the vertical direction. The pin member 20 and the grommet 22 will be described in detail with reference to new drawings.

Figure 3A:
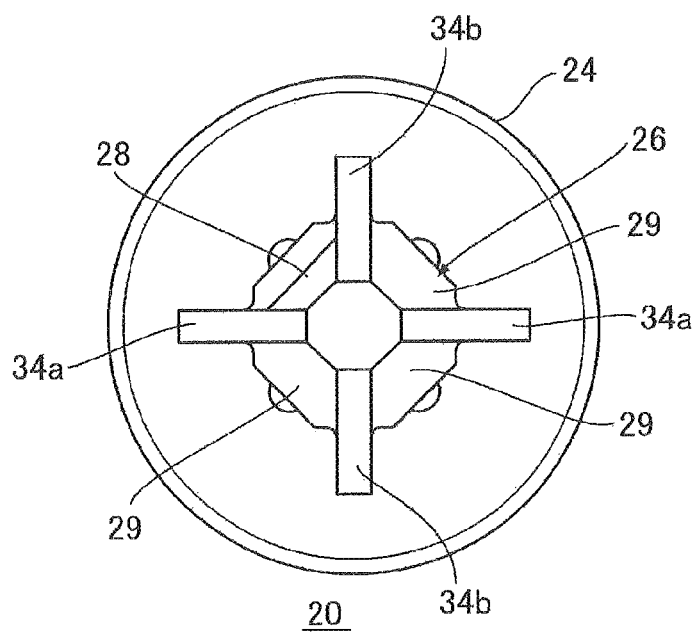
FIG. 3A is a bottom view of the pin member.
Figure 3B:
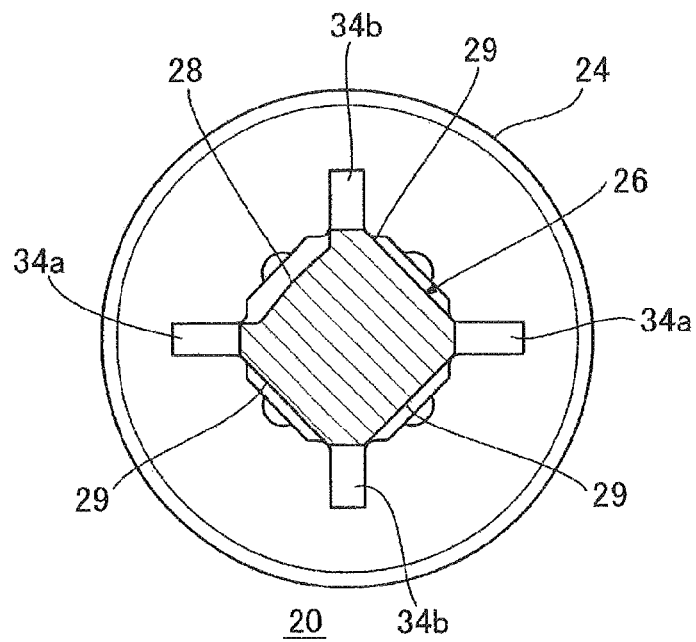
FIG. 3B is a sectional view of the pin member taken along line A-A in FIG. 2A.

FIGS. 2A and 2B are views for description of the pin member 20. FIG. 2A is a side view of the pin member 20, and FIG. 2B is a side view of the pin member 20 which is rotated by 90 degrees from the state shown in FIG. 2A. FIG. 3A is a bottom view of the pin member 20, and FIG. 3B is a sectional view of the pin member 20 taken along line A-A in FIG. 2A. The same or equivalent constituent elements or members shown in the drawings are given the same symbol and descriptions therefor may be omitted as appropriate.

The pin member 20 has the disc-like flange 24 to engage with the edge of the opening 42 of the grommet 22 and the body 26 to be inserted into the grommet 22 through its opening 42. The body 26 has a column-like portion 36 which is erected from the flange 24, a pyramid-like portion 31 which is tapered from the tip of the column-like portion 36, and four blade portions 34a and 34b which extend from the body 26 outward in the radial direction, are spaced from each other, and are arranged in the circumferential direction at equal intervals.

As shown in FIG. 3A, the pyramid-like portion 31 is shaped like a square pyramid and has four tapered surfaces. When the pin member 20 is pushed into the grommet 22, the four tapered surfaces come into contact with the respective leg pieces 44 and expand the leg pieces 44. As shown in FIG. 3B, one of the four tapered surfaces is a stepped tapered surface 28 that is recessed halfway and the remaining three are smooth, flat tapered surface 29. The stepped tapered surface 28 and the flat tapered surface 29 are inclined with respect to the center axis of the pin member 20. As shown in FIG. 2A, a portion of the column-like portion 36 which is continuous with the pyramid-like portion 31 is flat and is shaped like a square prism. And, a portion of the column-like portion 36 which is located on the side of the flange 24 is formed with lightening holes for weight reduction.

The stepped tapered surface 28 has a tip-side first tapered surface 28a, a parallel surface 28b which is continuous with the first tapered surface 28a, and a second tapered surface 28c which is continuous with the parallel surface 28b. That is, the stepped tapered surface 28 has two-stage tapered surfaces. The first tapered surface 28a is an inclined surface that is similar to the other, flat tapered surfaces 29, and the second tapered surface 28c has a larger inclination angle with respect to the center axis than the first tapered surface 28a, that is, is inclined more steeply than the first tapered surface 28a. The second tapered surface 28c is inclined more steeply than the flat tapered surfaces 29. As the tapered surfaces become steeper, the urging force that the pin member 20 receives from the leg pieces 44 in the push-back direction when the pyramid-like portion 31 of the pin member 20 is pressed against inclined surfaces 52 becomes stronger.

The parallel surface 28b is parallel with the center axis. Having the parallel surface 28b and the second tapered surface 28c, the stepped tapered surface 28 is recessed as compared with the flat tapered surfaces 29. The top end of the second tapered surface 28c is closer to the flange 24 than the top ends of the flat tapered surfaces 29 are. A tapered surface that is inclined more gently than the first tapered surface 28a and the second tapered surface 28c may be provided instead of the parallel surface 28b. In addition, the first tapered surface 28a and the second tapered surface 28c may have the same inclination angle with respect to the center axis.

The four blade portions 34a and 34b (referred to as "blade portions 34" when they are not discriminated form each other) are formed so as to project from the respective corners of the pyramid-like portion 31 outward in the radial direction. When the pin member 20 is inserted into the grommet 22, the blade portions 34 go into the respective slits 46 which are formed between the leg pieces 44 and thereby prevent the pin member 20 from rotating around the axis and allow the four tapered surfaces to come into contact with the four respective leg pieces 44 securely.

Among the four blade portions 34, the pair of blade portions 34a shown in FIG. 2A are formed such that their outer end surfaces in the radial direction are flat whereas the pair of blade portions 34b shown in FIG. 2B are formed such that each of their outer end surfaces in the radial direction is formed with plural lock portions. The blade portions 34b project outward in the radial direction more than the blade portions 34a, and go into the corresponding slits 46 and come into contact with the edge of the opening 42 when the pin member 20 is inserted. Each of the blade portions 34b has a first lock portion 30 to be locked on the edge of the opening 42 in a state where the pin member 20 is fixed to the grommet 22 tentatively and a second lock portion 32 to be locked on the edge of the opening 42 in a state where attachment members are attached to each other.

Each of the first lock portion 30 and the second lock portion 32 is formed by recessing the outer end surface of the blade portion 34b in the radial direction, and the edge of the opening 42 goes thereinto and is locked thereon. Each blade portion 34b is formed with holes so as to be bent easily when the first lock portion 30 or the second lock portion 32 clears the edge of the opening 42. In clearing the edge of the opening 42, the second lock portion 32 is bent to cause a force for pushing back the pin member 20. The blade portion 34a can be molded easily because they have a simple shape.

FIGS. 4A to 4C are views for description of the grommet 22. FIG. 4A is a top view of the grommet 22, FIG. 4B is a bottom view of the grommet 22, and FIG. 4C is a sectional view of the grommet 22 taken along line B-B in FIG. 4A.

As shown in FIGS. 4B and 4C, the back surface of the head portion 40 is formed with plural projections 60, which suppress play by coming into contact with the surface of an attachment member in a fully-attachment state. The inner surfaces of the projections 60 in the radial direction are located inside the outer circumference of the recess 58 in the radial direction.

As shown in FIG. 4C, each leg piece 44 has a bendable portion 48 which projects from the back surface of the head portion 40, a bottom thick portion 50 which is continuous with the bendable portion 48, an inclined surface 52 which is an inner surface of the leg piece 44, and a contact portion 56 which is located at an inner edge of the inclined surface 52 in the radial direction.

The bendable portion 48 projects from the thick portion 50 in the axial direction toward the head portion 40, and is thinner than the thick portion 50 and is bendable so as to be expanded outward. The bendable portion 48 is longer than the thick portion 50 in the axial direction. The bendable portion 48 is bent when the pyramid-like portion 31 of the pin member 20 is pressed against the inclined surface 52, and thereby produces urging force in such a direction as to push back the pin member 20 and in such a direction as to come into contact with the outer circumferential surface of the pin member 20.

When the pin member 20 is pushed in, the inclined surface 52 comes into contact with the pyramid-like portion 31, receives a pushing force from the pyramid-like portion 31, and thereby moves the leg piece 44 outward. The inclined surface 52 is inclined downward as it approaches toward the center axis. That is, the inclined surface 52 comes closer to the center axis as it extends from the head portion 40 side toward the bottom end.

The inclined surface 52 is spaced from an inner surface 48a of the bendable portion 48 inward by a prescribed interval in the radial direction through a recess 54. By forming the recess 54, the length of the bendable portion 48 in the axial direction can be made greater than in a case that the inclined surface 52 is made continuous with the inner surface 48a without the recess 54. The uppermost edge 52a of the inclined surface 52 is located above a lowermost portion 48b of the bendable portion 48.

The contact portion 56 comes into contact with the outer circumferential surface of the pin member 20 in a state where the pin member 20 has been pushed in fully. The fully-pushed-in state is a state where attachment of attachment members has completed and the second lock portion 32 is locked on the edge of the opening 42. The contact portion 56 is formed at an inner edge of the inclined surface 52 in the radial direction and located at the projection end of the inclined surface 52 which projects inward in the radial direction. The contact portion 56 is located inside the lowermost portion 48b of the bendable portion 48 in the radial direction. It suffices that the contact portion 56 be located approximately at the same position in the axial direction as the lowermost portion 48b of the bendable portion 48. With this configuration, the contact portion 56 can be located closer to the head portion 40 and the fastening force can be made stronger in a fully-pushed-in state than in a case that the inclined surface 52 projects from the lowermost portion 48b.

Figure 5B:
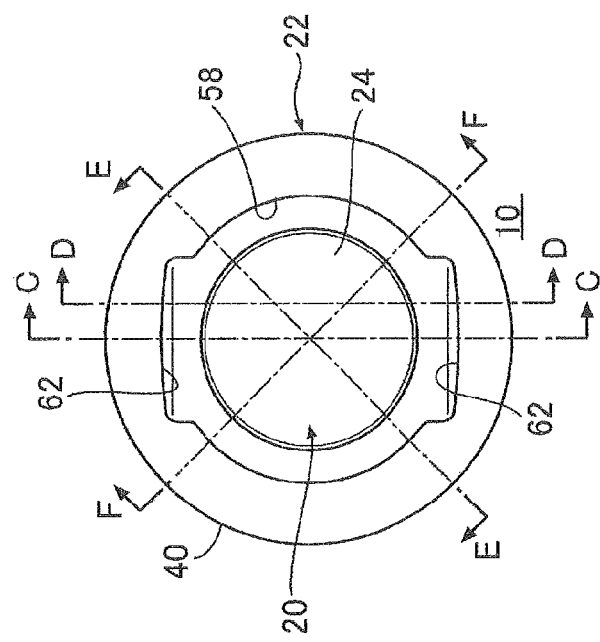
FIG. 5B is a top view of the fastener.
Figure 5A:
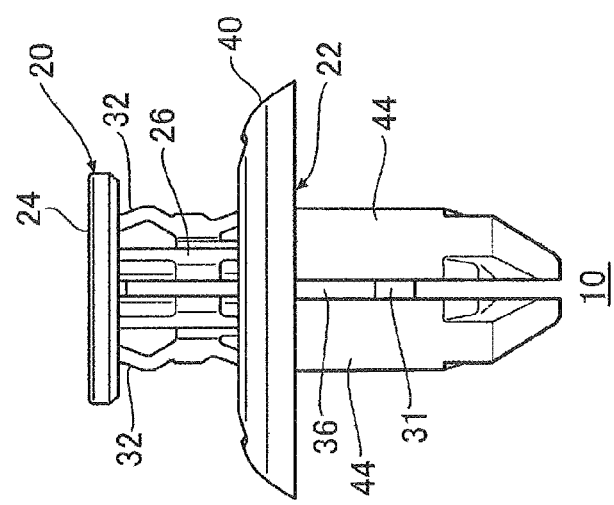
FIG. 5A is a side view of the fastener.

FIG. 5A is a side view of the fastener 10, and FIG. 5B is a top view of the fastener 10. FIG. 6A is a sectional view of the fastener 10 taken along line C-C in FIG. 5B, and FIG. 6B is a sectional view of the fastener 10 taken along line D-D in FIG. 5B. In FIGS. 5A to 6B, the fastener 10 is in a tentatively-fixed state and form a unit. In the tentatively-fixed state, as shown in FIG. 6A, the pin member 20 is inserted in the opening 42 and the first lock portions 30 of the pin member 20 are locked on the edge of the opening 42 of the grommet 22. Forming a unit, the fastener 10 can be transported easily to a vehicle assembling factory and dispenses with time and labor of preparing the pin member 20 and the grommet 22 separately and assembling them.

As shown in FIG. 6A, the first lock portion 30 which is formed in each blade portion 34b by recessing its outer end surface in the radial direction is locked so as to nip the head portion 40 by coming into contact with the front edge and the back edge of the opening 42. A lower portion of the first lock portion 30 to be brought into contact with the back edge of the opening 42 is formed so as to be less bendable than its upper portion. Thus, the pin member 20 does not come off the opening 42 easily. To this end, the upper portion of the first lock portion 30 is made more bendable by forming a first hole 33 in the blade portion 34b. A lower portion of the second lock portion 32 is made bendable by a second hole 35.

As shown in FIG. 5A, the pin member 20 is inserted in the space surrounded by the plural leg pieces 44 and the pyramid-like portion 31 of the pin member 20 is located inside the plural leg pieces 44. In the tentatively-fixed state, the pyramid-like portion 31 is not pressed against the inclined surfaces 52 and the leg pieces 44 are not expanded.

FIG. 6B shows cross sections of the stepped tapered surface 28 and a flat tapered surface 29. The body 26 is set inside the plural leg pieces 44. If the pin member 20 is pushed down from the tentatively-fixed state, the upper portions of the first lock portions 30 (see FIG. 6A) are bent and go across the edge of the opening 42, whereby the locking is released and the flat tapered surfaces 29 and the stepped tapered surface 28 come into contact with the respective inclined surfaces 52.

FIGS. 7A to 7C are views for description of how the fastener 10 is attached. FIG. 7A is a sectional view of the fastener 10 taken along line E-E in FIG. 5B and shows a state before attachment of the fastener 10 to a first attachment member 12 and a second attachment member 14. FIG. 7B shows a state where the pin member 20 has been pushed in halfway to attach it to the first attachment member 12 and the second attachment member 14. FIG. 7C shows a fully-pushed-in state.

FIG. 7A shows a state where the pin member 20 is fixed tentatively to the grommet 22. The fastener 10 in the tentatively-fixed state is inserted into a first attachment hole 12a of the first attachment member 12 and a second attachment hole 14a of the second attachment member 14, and the pin member 20 is pushed down. For example, a trim board as the first attachment member 12 is laid on a vehicle body panel as the second attachment member 14, then the first attachment hole 12a and the second attachment hole 14a are positioned with respect to each other, and finally the fastener 10 is inserted. When the pin member 20 in the tentatively-fixed state is pushed down, the first lock portions 30 go across the edge of the opening 42, whereby the tentatively-fixed state is released and the tapered surfaces of the pyramid-like portion 31 come into contact with the respective inclined surfaces 52.

As shown in FIG. 7B, the flat tapered surfaces 29 come into contact with the inclined surfaces 52 and, because of the inclinations, the downward pushing forces produce radial, outward forces, whereby the leg pieces 44 are expanded. The thin bendable portions 48 are bent outward in the radial direction and the leg pieces 44 are expanded. On the other hand, the thick portions 50 which are thicker than the bendable portions 48 are hardly deformed. In the state shown in FIG. 7B in which the flat tapered surfaces 29 is in contact with the inclined surfaces 52 or the contact portion 56, the pin member 20 is urged in the push-back direction because of the bends of the bendable portions 48. If the pushing is stopped halfway, the pin member 20 is pushed back and moved upward. The attachment is not completed until the pin member 20 is pushed in thoroughly.

As shown in FIG. 7C, the pin member 20 is pushed in further, whereby the leg pieces 44 are expanded further and the flange 24 of the pin member 20 comes into contact with the head portion 40, to establish a fully-pushed-in state. In the fully-pushed-in state, the contact portions 56 are in contact with the column-like portion 36. Since the column-like portion 36 is formed so as to have surfaces that are parallel with the center axis, the leg pieces 44 do not urge the pin member 20 in such a direction as to push it back. A stable state is thus established. In the fully-pushed-in state, the second lock portions 32 are locked on the edge of the opening 42 and movement of the pin member 20 in the axial direction is restricted.

The leg pieces 44 are expanded and the outer surfaces of the bendable portions 48 are engaged with the backside edge of the second attachment hole 14a. Furthermore, the head portion 40 is engaged with the front surface of the first attachment member 12. Thus, the first attachment member 12 is attached to the second attachment member 14.

Since whatever portions of the outer surfaces of the bendable portions 48 are engageable with the edge of the second attachment hole 14a by expanding the leg pieces 44, various thicknesses of the first attachment member 12 and the second attachment member 14 can be fastened. As the bendable portions 48 are made longer in the axial direction, it becomes applicable to more various thicknesses of the first attachment member 12 and the second attachment member 14. For example, vehicle trim boards and vehicle body panels may vary depending on vehicle types and have thick portions and thin portions. Since the bendable portions 48 employed in the embodiment are long in the axial direction as a result of forming the recesses 54, the wide thickness ranges of attachment members can be attached accordingly.

On the other hand, as the bendable portions 48 are made longer in the axial direction, they become more bendable and the force of fastening the first attachment member 12 and the second attachment member 14 may become weaker. In this connection, the present inventor has found that the fastening force becomes stronger as the positions of the contact portions 56 are set closer to the head portion 40. Thus, in the fastener 10 according to the embodiment, by setting the positions of the contact portions 56 inside the lowermost portions 48b or their vicinities of the bendable portions 48 in the radial direction, the contact portions 56 can be disposed at higher positions and the fastening force can be made stronger than in a case that the inclined surfaces 52 are made continuous with the respective inner surfaces 48a without the recesses 54.

To make the fastener 10 applicable to more various thicknesses of attachment members, it is necessary to elongate the thin bendable portions 48 in the axial direction. However, since this results in weakening of the fastening force of the fastener 10, the grommet 22 of the embodiment is formed such that the positions of the inclined surfaces 52 and the contact positions 56 are set higher. As a result, the recesses 54 are formed between inclined surfaces 52 and the bendable portions 48, respectively.

The term "vicinity of the lowermost portion 48b of each bendable portion 48" means a range consisting of prescribed ranges immediately above and below the lowermost portion 48b in the axial direction. The prescribed ranges may be 10% or less of the axial length of each bendable portion 48. Since the contact portions 56 are located inside the respective lowermost portions 48b in the radial direction, the lowermost portions 48b of the bendable portions 48 can be located at positions that are distant from the respective contact portions 56 in the radial direction, whereby the bend amount of the bendable portions 48 can be increased and hence the fastening force can be made stronger. As described above, by forming the recesses 54, the fastening force of the fastener 10 can be prevented from being reduced while the bendable portions 48 are elongated in the axial direction.

Figures 8A, 8B:
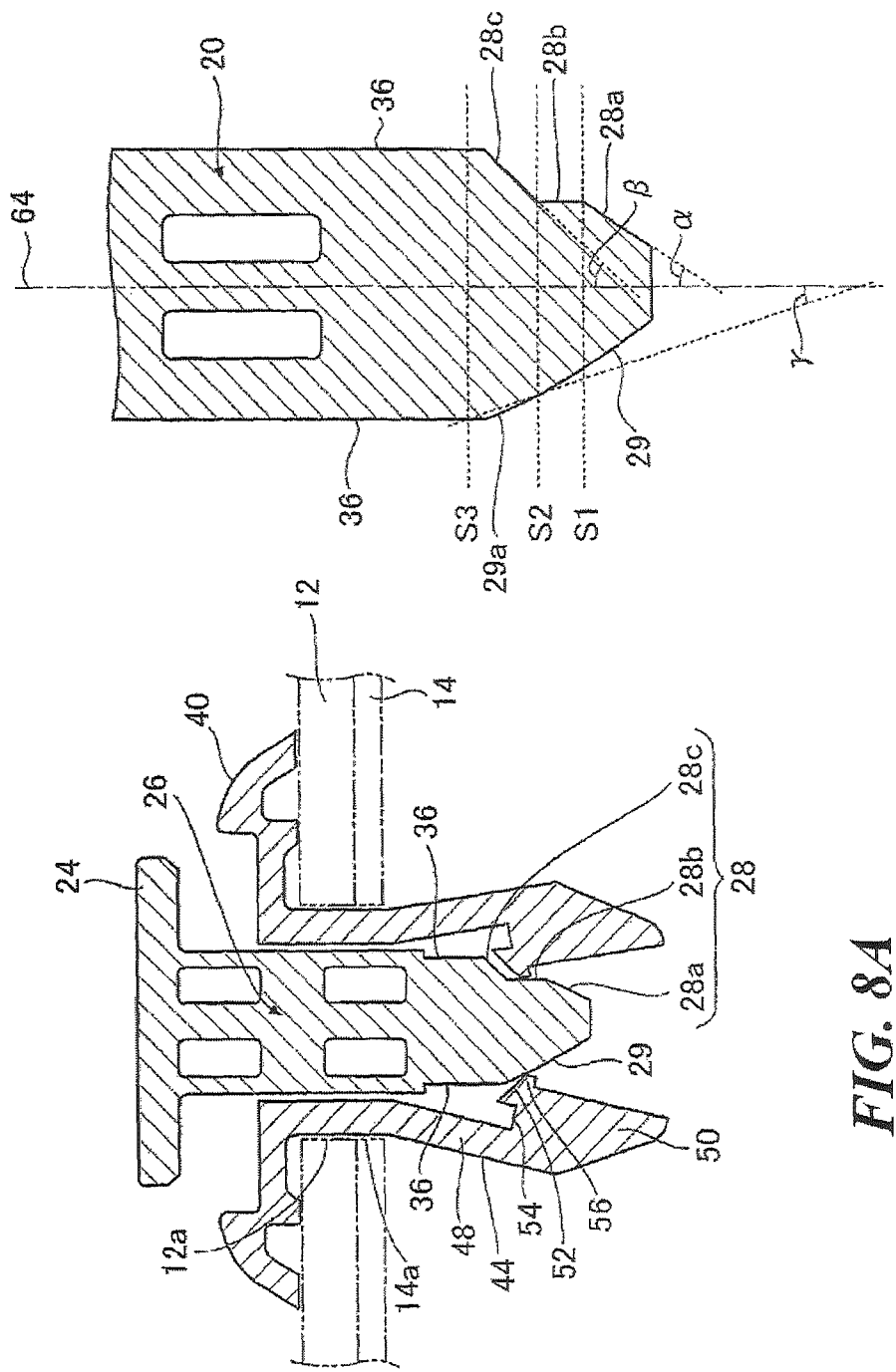
FIGS. 8A and 8B are views for description of how a stepped tapered surface works.
Figure 9:
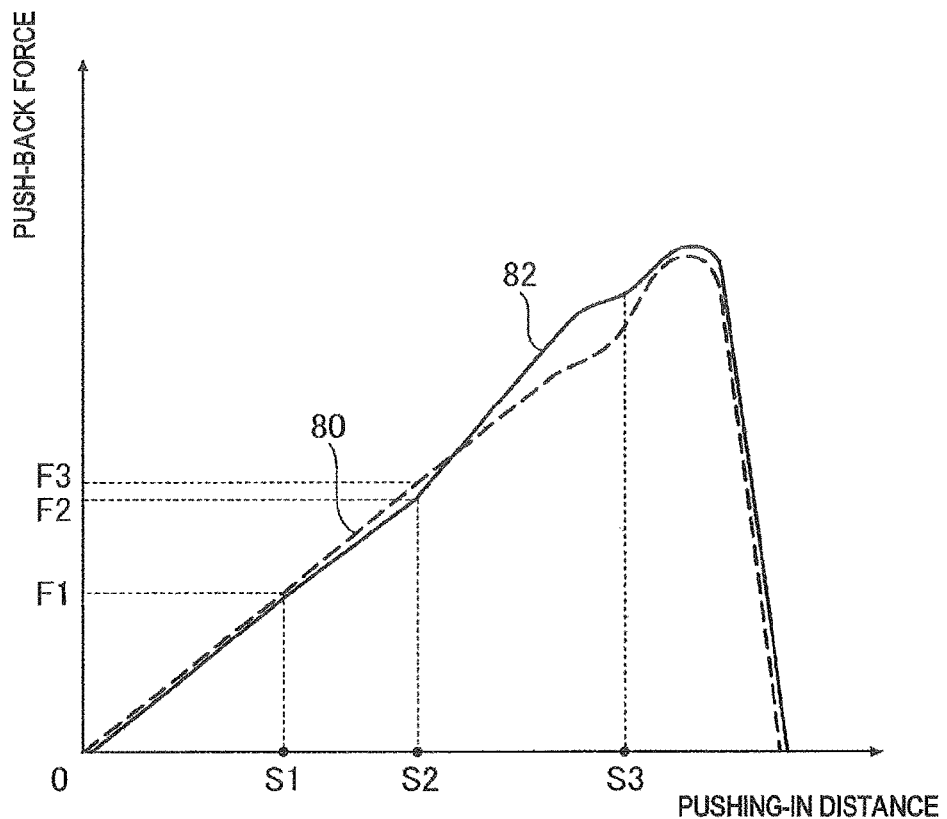
FIG. 9 is a graph for description of a relationship between the pushing-in distance and the push-back force acting on the pin member when the pin member is pushed into the grommet.

FIGS. 8A and 8B are views for description of how the stepped tapered surface 28 works. FIG. 8A is a sectional view of the fastener 10 taken along line F-F in FIG. 5B and shows a halfway state of attachment work. FIG. 8B is an enlarged sectional view of the pin member 20 shown in FIG. 8A. FIG. 9 is a graph for description of a relationship between the pushing-in distance and the push-back force acting on the pin member 20 when the pin member 20 is pushed into the grommet 22.

In a state shown in FIG. 8A in which the inclined surface 52 or the contact portion 56 is in contact with the parallel surface 28b, the leg piece 44 that is expanded by the stepped tapered surface 28 is smaller in the amount of an outward bend in the radial direction than each leg piece 44 that is expanded by the corresponding flat tapered surface 29. And, the push-back force acting on the pin member 20 from the expanded leg piece 44 becomes weaker by the stepped tapered surface 28.

As shown in FIG. 8B, the first tapered surface 28a ranges from the tip of the pin member 20 to a position S1 in the axial direction and the second tapered surface 28c ranges from a position S2 to a position S3 in the axial direction. An opposite tapered surface 29a is defined as a portion of each flat tapered surface 29 ranging from the position S2 to the position S3 in the axial direction plus a portion of the column-like portion 36 continuous therewith. The opposite tapered surface 29a may include a gently curved surface that connects the flat tapered surface 29 and the column-like portion 36 and part of the column-like portion 36.

An inclination angle α of the first tapered surface 28a with respect to the center axis 64 is smaller than an inclination angle β of the second tapered surface 28c. An inclination angle γ of the opposite tapered surface 29a which is opposite to the second tapered surface 28c is smaller than the inclination angle β of the second tapered surface 28c.

As the inclination angle of a tapered surface increases, that is, as it is inclined more steeply, when a force is received by the tapered surface of the pin member 20 from a leg piece 44 through the contact, a component of the force in the push-back direction becomes stronger. If the push-back force acting on the pin member 20 is weaker than the frictional force between the pin member 20 and the grommet 22, the pin member 20 is held by the frictional force and is not pushed back. The frictional force between the pin member 20 and the grommet 22 increases as the leg piece 44 is expanded more. In a state where the frictional force is stronger than the push-back force, the pin member 20 is not pushed back upward when a pushing-in operation of the pin member 20 is stopped halfway. For example, if a worker stops the pushing operation of the pin member 20 before it has been completed, the pin member 20 is kept inserted and hence the worker may misperceive that the pushing-in operation has been completed. Since the second tapered surface 28c of the stepped tapered surface 28 of the embodiment causes the pin member 20 to be pushed back if the pushing-in operation is stopped before it has been completed, the probability of occurrence of an attachment failure can be lowered.

In FIG. 9, the origin corresponds to an initial state where the pin member 20 has been pushed in and tapered surfaces of the pin member 20 have just come into contact with the inclined surfaces 52 of the leg pieces 44. In the initial state, since the leg pieces 44 are not expanded, the push-back force acting on the pin member 20 is 0. Pushing-in distances S1-S3 shown in FIG. 9 correspond to the respective positions S1-S3 in the axial direction shown in FIG. 8B.

A first curve 80 shown in FIG. 9 indicates a relationship between the pushing-in distance and the push-back force of a fastener of a comparative technique for comparison with the fastener 10 according to the embodiment. The fastener of the comparative technique is the same as the fastener 10 according to the embodiment except that the former is not formed with the stepped tapered surface 28 and all of the tapered surfaces of the pyramid-like portion 31 of the former are flat tapered surface 29. A second curve shown in FIG. 9 indicates a relationship between the pushing-in distance and the push-back force of the fastener 10 according to the embodiment.

In the first curve 80, the push-back force acting on the pin member 20 increases gradually as the pushing-in distance of the pin member 20 from the origin increases and the leg pieces 44 are expanded more by the flat tapered surfaces 29. Before the pushing-in distance reaches S3, since the inclination of the flat tapered surfaces 29 decreases, the push-back force of the first curve 10 decreases. After the pushing-in distance passes S3, since the second lock portions 32 have gone across the edge of the hole 42, the push-back force increases steeply.

As to the fastener of the comparative technique, an analysis by the present inventor found that, while the push-back force is stronger than the frictional force at an initial stage of a pushing-in operation, the relationship is reversed halfway through the pushing-in operation. More specifically, the analysis found that the frictional force exceeds the push-back force in the pushing-in distance range between S2 and S3, that is, in a state where the portion of each flat tapered surfaces 29 (see FIG. 8B) is in contact with the corresponding inclined surface 52. On the other hand, the pin member 20 of the embodiment is formed with the stepped tapered surface 28 to compensate for the insufficiency of the push-back force of the flat tapered surfaces 29. Thus, the push-back force in the pushing-in distance range between S2 and S3 is increased by means of the second tapered surface 28c. As a result, even if a worker stops pushing in the pin member 20 immediately before the pushing-in operation has been completed, the pin member 20 is pushed back so that the worker can recognize the non-completion of the attachment work.

As to the fastener 10 according to the embodiment, in the pushing-in distance range from 0 to S1, the push-back force of the second curve 82 is the same as that of the first curve 80. In the pushing-in distance range from S1 to S2, the push-back force of the second curve 82 is weaker than that of the first curve 80, because the push-back force exerted from the leg piece 44 to the parallel surface 28b through the contact is weaker. In the pushing-in distance range from S2 to S3, the push-back force of the second curve 82 turns stronger than that of the first curve 80, because the push-back force exerted from the leg piece 44 to the second tapered surface 28c through the contact increases rapidly. When the second lock portions 32 go across the edge of the opening 42, the push-back force is increased further. After the second lock portions 32 have gone across the edge of the opening 42, as shown in FIG. 7C, the contact portions 56 come into contact with the column-like portion 36, and the push-back force acting on the pin member 20 becomes 0. The second lock portions 32 function to exert the push-back force on the pin member 20 immediately before the pushing-in operation has been completed.

The pin member 20 can be pushed back by the second tapered surface 28c as long as the coefficient $\mu$, of friction between the pin member 20 and the grommet 22 of the embodiment is in a range of 0.24 to 0.32, the inclination angle $\beta$ of the second tapered surface 28c is in a range of 22 degrees to 29 degrees, and the inclination angle $\gamma$ of the opposite tapered surface 29a is in a range of 11 degrees to 15 degrees. Allowing a frictional coefficient in the range of 0.24 to 0.32 enables manufacture using an inexpensive molding die having prescribed surface roughness and reduction of manufacturing cost. Furthermore, even if small or shallow flow marks or the like are formed in the fastener 10 at the time of molding, the frictional coefficient $\mu$ can be adjusted to fall within the range of 0.24 to 0.32.

More preferably, the pin member 20 can be pushed back by the second tapered surface 28c more reliably if the coefficient $\mu$ of friction between the pin member 20 and the grommet 22 is in a range of 0.26 to 0.30, the inclination angle $\beta$ of the second tapered surface 28c is in a range of 23 degrees to 27 degrees, and the inclination angle $\gamma$ of the opposite tapered surface 29a is in a range of 12 degrees to 14 degrees. In this case, the pin member 20 can be pushed back by the second tapered surface 28c even if the surface roughness of a molding die becomes high after the repeated use of the molding die, which would result in increase of the coefficient of friction between the pin member 20 and the grommet 22.

Since the stepped tapered surface 28 which is one of the tapered surfaces of the pyramid-like portion 31 is recessed, a failure of attachment of the pin member 20 can be prevented. Since the tapered surfaces other than the one have the conventional shape, the manufacturing cost of a die etc. can be suppressed low. Furthermore, a die can be manufactured easily because merely an adjustment to a portion corresponding to the stepped tapered surface 28 is required.

The invention is not limited to the above-described embodiment, and various modifications such as design modifications can be made to the embodiment based on the knowledge of those skilled in the art. The embodiment with such modifications will also fall within the scope of the invention.

In the embodiment, the grommet 22 is formed with the four leg pieces 44, and the pin member 20 is formed with the pyramid-like portion 31 which is shaped like a square pyramid. However, the invention is not limited thereto. For example, the number of leg pieces 44 may be two or three or larger than or equal to five. The number of tapered surfaces formed on the pyramid-like portion 31 of the pin member 20 is determined correspondingly with the number of the leg pieces 44.

In the embodiment, one of the four tapered surfaces of the pyramid-like portion 31 is formed with the stepped tapered surface 28. However, the invention is not limited thereto. For example, two or three of the four tapered surfaces may be formed as the stepped tapered surface 28, and the other tapered surface(s) may be formed as the flat tapered surface 29. In either case, the pin member 20 can be pushed back if the pushing-in operation of the pin member 20 is stopped halfway by virtue of the stepped tapered surface 28.

In the embodiment, each blade portion 34a is formed with neither the first lock portion 30 nor the second lock portion 32 and each blade portion 34b is formed with them. However, the invention is not limited thereto. Like each blade portion 34b, each blade portion 34a may be formed with the first lock portion 30 and the second lock portion 32. This further suppress play of the pin member 20 with respect to the grommet 22 in a state where the first lock portions 30 or the second lock portion 32 are locked.

In the embodiment, the stepped tapered surface 28 is formed with the first tapered surface 28a and the second tapered surface 28c. However, the invention is not limited thereto. For example, instead of the first tapered surface 28a, an non-tapered parallel surface may be formed by extending the parallel surface 28b to the tip of the pin member 20. Such a stepped tapered surface 28 may have the parallel surface formed on the tip side and the tapered surface that is continuous with the parallel surface and is formed on the side of the flange 24. The tapered surface on the side of the flange 24 may be inclined more steeply than the flat tapered surfaces 29. Also in this configuration, the pin member 20 can be pushed back if the pushing-in operation of the pin member 20 is stopped halfway by virtue of the tapered surface on the side of the flange 24.

DESCRIPTION OF SYMBOLS

10: Fastener; 12: First attachment member; 12a: First attachment hole; 14: Second attachment member; 14a: Second attachment hole; 20: Pin member; 22: Grommet; 24: Flange; 26: Body; 28: Stepped tapered surface; 28a: First tapered surface; 28b: Parallel surface; 28c: Second tapered surface; 29: Flat tapered surface; 30: First lock portion; 31: Pyramid-like portion; 32: Second lock portion; 34a, 34b: Blade portion; 36: Column-like portion; 40: Head portion; 42: Opening; 44: Leg piece; 46: Slit; 48: Bendable portion; 48a: Inner surface; 50: Thick portion; 52: Inclined surface; 54: Recess; 56: Contact portion; 58: Recess; 60: Projection; 62: Disengagement cut.

INDUSTRIAL APPLICABILITY

The present invention relates to a fastener to be attached to attachment holes of attachment members.

The invention claimed is:

1. A fastener which is made of a resin and which is to be attached to attachment holes of attachment members, the fastener comprising:
a grommet having
a head portion with an opening, and
plural leg pieces engageable with an edge of the attachment holes of the attachment members at their outer surfaces by being expanded; and
a pin member which is pushed in through the opening to thereby expand the plural leg pieces,
wherein each of the leg pieces has:
a bendable portion which projects downward from the head portion and which is bendable to be expanded;
an inclined surface which is inclined downward as it approaches toward a center axis, and which receives a push-in force from the pin member when the pin member is pushed in; and
a recess formed between the bendable portion and the inclined surface, and
wherein the inclined surface is formed so as to be distant from an inner surface of the bendable portion inward in a radial direction through the recess.

2. The fastener of claim 1,
wherein each of the leg pieces further has:
a contact portion which is formed at an inner edge of the inclined surface in the radial direction and which is in contact with the pin member in a state where the pin member has been pushed in fully, and
wherein the contact portion is located inside a lowermost portion of the bendable portion or its vicinity in the radial direction.

3. The fastener of claim 1,
wherein the pin member has:
a pyramid portion with plural tapered surfaces at its bottom, and
a column portion which is continuous with the pyramid portion and which is shaped like a column,
wherein the bendable portions urge the pin member such that, the tapered surfaces of the pin member are pressed against the respective inclined surfaces, the pin member is pushed back, and
wherein at least one of the plural tapered surfaces is inclined more steeply with respect to the center axis on a side of the column portion than an other one of the tapered surfaces.

4. The fastener of claim 3,
wherein the one of the tapered surfaces is recessed more than the other one of the tapered surfaces.

5. The fastener of claim 3, wherein the one of the tapered surfaces has
a first tapered surface which is located on a side of the bottom, and
a second tapered surface which is located on the side of the column portion as compared with the first tapered surface and which has an inclination with respect to the center axis steeper than that of the first tapered surface.

6. The fastener of claim 1,
wherein the pin member has:
a lock portion which projects outward in the radial direction, which is locked on an edge of the opening in a state where the pin member has been pushed in fully, and which is deformable to go across the edge of the opening, and
wherein the lock portion is configured to produce a force to push back the pin member when the lock portion goes across the edge of the opening.

7. The faster of claim 1,
wherein each of the leg pieces further has:
a thick portion which is thicker than the bendable portion and which is continuous with an extending tip of the bendable portion.

* * * * *